United States Patent

Strenzke et al.

[11] Patent Number: 5,145,238
[45] Date of Patent: Sep. 8, 1992

[54] METHOD OF BRAKING A VEHICLE

[75] Inventors: Hilmar Strenzke, Aschaffenburg; Erwin Hartung, Stockstadt, both of Fed. Rep. of Germany

[73] Assignee: Linde Aktiengesellschaft, Fed. Rep. of Germany

[21] Appl. No.: 478,480

[22] Filed: Feb. 12, 1990

[30] Foreign Application Priority Data

Feb. 24, 1989 [DE] Fed. Rep. of Germany ....... 3905794

[51] Int. Cl.$^5$ .............................................. F16H 39/50
[52] U.S. Cl. ..................................... 303/10; 180/54.1; 303/100
[58] Field of Search ................. 303/10, 100, 102, 103; 180/54.1, 197

[56] References Cited

U.S. PATENT DOCUMENTS 4,171,029 10/1979 Beale ................................. 180/54.1

FOREIGN PATENT DOCUMENTS 2205632 12/1988 United Kingdom .

*Primary Examiner*—Matthew C. Graham
*Attorney, Agent, or Firm*—Webb, Burden, Ziesenheim & Webb

[57] ABSTRACT

A method for braking a wheeled vehicle which has at least one adjustable hydrostatic drive unit with a variable displacement pump and a motor and a driving engine wherein the vehicle driving engine absorbs a drag moment and the kinetic energy of the vehicle is partially reduced hydraulically after the maximum drag moment which is absorbable by the vehicle driving engine is exceeded. In the method positive hydraulic braking is achieved when a limiting rpm of the driving engine is exceeded and the vehicle is braked to a speed at which the incline output power is less than or of the same magnitude as the drag power which is absorbable by the driving engine.

19 Claims, 1 Drawing Sheet

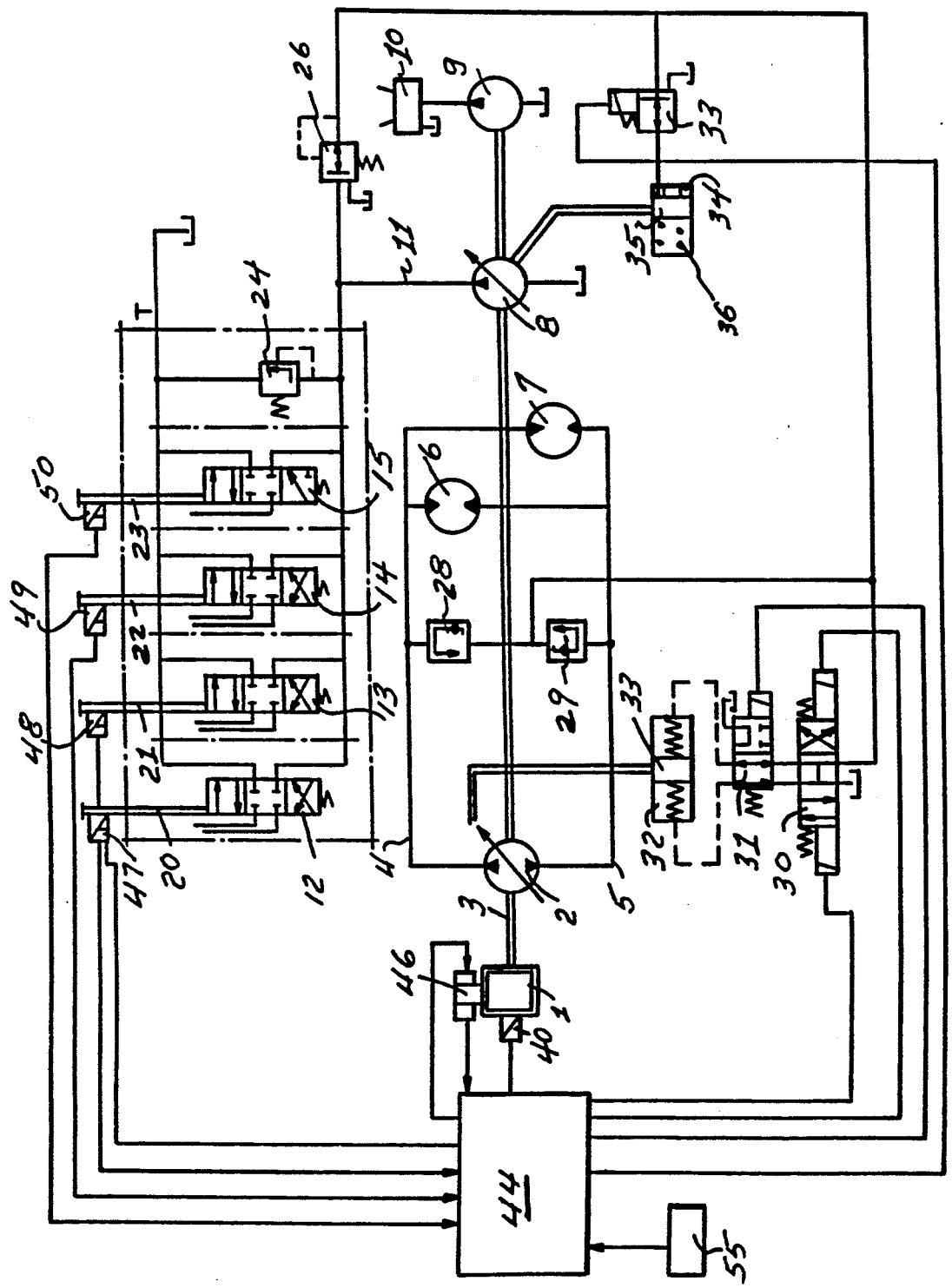

METHOD OF BRAKING A VEHICLE

BACKGROUND OF THE INVENTION

The invention is a method for braking a vehicle having an adjustable hydrostatic drive unit, in which the driving engine absorbs a drag moment and the kinetic energy of the vehicle is partially reduced hydraulically when the maximum drag moment absorbable by the driving engine is exceeded. U.K. Patent Application No. 2,205,632, which is hereby incorporated by reference, discloses that a vehicle with a hydrostatic drive unit can be braked hydraulically without running the driving engine or the hydrostatic motor at an excessively high rpm because a regulator adjusts a variable displacement pump for an additional hydraulic drive toward the full delivery volume after a limiting rpm value is exceeded on the drive motor side and the delivery pressure generated is reduced by valves, to cause a reduction in the kinetic energy of the vehicle and the driving engine is simultaneously slowed, i.e., the speed is reduced.

However, this braking process is disadvantageous because when a vehicle traveling downhill is to be braked in this manner, i.e., a vehicle upon which kinetic energy is acting, in addition to the kinetic energy, the power in the hydraulic circuit is continuously converted to heat as long as the downhill travel continues and the drag moment of the vehicle is greater than that which can be absorbed by the driving engine. Under certain circumstances, the vehicle will proceed at a constant high speed, but a speed increase may be prevented by braking. However, the oil in the hydraulic circuit may be heated to a temperature that requires cooling which protects the driving engine from damage but braking of the vehicle does not occur and an additional brake must be used to stop the vehicle.

The present invention avoids the above shortcomings and provides an improved hydraulic braking method while avoiding overspeeds of the driving engine.

SUMMARY OF THE INVENTION

A method for braking a vehicle having a hydrostatic drive unit in which the driving engine absorbs a drag moment and the kinetic energy of the vehicle is at least partially reduced hydraulically when the drag moment is exceeded. In accordance with the invention when a limiting rpm of the driving engine is exceeded, positive hydraulic braking takes place and the vehicle is slowed to a speed at which the incline output power present is smaller than or of the same magnitude as the drag power absorbable by the driving engine to prevent a constant hydraulic braking.

BRIEF DESCRIPTION OF THE DRAWING

The drawing is a diagram of a system which can be operated in accordance with the method of the invention.

DESCRIPTION OF THE PREFERRED EMBODIMENTS

With reference to the drawing, an internal combustion engine 1 drives a pump 2 of a hydrostatic transmission by means of a shaft 3. Pump 2 is connected by lines 4 and 5 in a closed circuit to hydraulic motors 6 and 7. The shaft 3 also drives an adjustable pump 8 and a fixed displacement pump 9 which is used to charge a steering device 10 of a vehicle.

Each valve 12, 13, 14 and 15 is connected to a line 11 and to a hydrostatic energy consumer (not shown) by actuating members 20, 21, 22 and 23. An adjustable pressure limiting valve 24 is connected between a drain line from the valves and line 11 to protect line 11 from an excess pressure.

Line 11 is also connected to an adjustable pressure reducing valve 26. The discharge of valve 26 is connected to an electrically controlled proportional valve 30 which is connected to a valve 31 which is connected to one of the chambers in actuating cylinder 32 having spring-biased piston 33. Actuating cylinder 32 is mechanically connected to the actuating member of pump 2. Valves 30 and 31, cylinder 32 and piston 33 actuate the hydrostatic transmission.

Valve 26 is also connected to valves 28 and 29 which are connected to one of the two lines 4 and 5 which carry a lower pressure to compensate for any leakage losses in the closed circuit which includes pump 2 and hydrostatic motors 6 and 7.

Valve 26 is also connected to an electrically controlled proportional valve 33 which discharges to an actuating cylinder 34. Actuating cylinder 34 has a piston 35 which is connected to the actuating member for adjustable pump 8. Piston 35 operates against the bias of a spring 36.

The internal combustion engine 1 is connected to an actual speed valve transmitter 40 which is electrically connected to a controller 44. One output of controller 44 is electrically connected to an adjusting member 46 for the internal combustion engine.

The actuating members 20, 21, 22 and 23 are, respectively, connected to travel signal transmitters 47, 48, 49 and 50 which are electrically connected to controller 44. An adjustable set point signal transmitter 55 is electrically connected to controller 44 to provide a set point signal as reference variable to the controller. Controller 44 is also electrically connected to proportional valve 37 and to the coil of valve 30.

SUMMARY OF THE INVENTION

A method for braking a vehicle having a hydrostatic drive unit in which the driving engine absorbs a drag moment and the kinetic energy of the vehicle is at least partially reduced hydraulically when the drag moment is exceeded. In accordance with the invention when a limiting rpm of the driving engine is exceeded, positive hydraulic braking takes place and the vehicle is slowed to a speed at which the incline output power present is smaller than or of the same magnitude as the drag power absorbable by the driving engine to prevent a constant hydraulic braking.

BRIEF DESCRIPTION OF THE DRAWING

The drawing is a diagram of a system which can be operated in accordance with the method of the invention.

DESCRIPTION OF THE PREFERRED EMBODIMENTS

According to the method of the invention, a positive hydraulic braking will occur when a limiting rpm of the driving engine is exceeded and the vehicle is braked to a speed at which the incline output power is less than or of the same magnitude as the drag power absorbable by the driving engine, so that in spite of a constant incline output force, the vehicle does not accelerate. After the braking process is initiated, braking becomes so intense that the vehicle attains a low speed suitable for the incline. The kinetic energy of the vehicle is thus reduced and the control of the vehicle is returned to the operator. In contrast to the state of the art, the hydraulic braking takes place long enough and with sufficient intensity to achieve a lower travel speed. The method is regulated by an electronic subassembly that acts on the control elements of the hydraulic units and valves. The rpm of the driving engine or its temporary increase or decrease serves as a measure of the drag moment. The speed of the driving engine can be monitored with the aid of conventional sensors. The hydraulic braking causes a conversion of the kinetic energy of the vehicle into heat due to a controlled pressure reduction in the hydraulic circuit by pressure limiting valves.

This occurs according to one embodiment of the invention because the variable displacement pump of the hydrostatic drive unit in the vehicle drive is adjusted to a lower discharge volume and the pressure into the feed lines of the hydrostatic drive unit is reduced by at least one pressure limiting valve. The reduction in the discharge volume of the variable displacement pump of the hydrostatic drive unit matches a transmission change toward a lower vehicle speed. If the speed of the driving engine increases too sharply, the delivery volume can be returned to zero so that the driving engine is uncoupled from the hydrostatic drive unit. The pressure rise in the feed lines of the hydrostatic drive unit is reduced by pressure limiting valves until a preselectable low speed is reached, the speed of the variable displacement motor can also be monitored for this purpose, especially if the driving engine is uncoupled from the hydrostatic drive unit by reducing the discharge volume of the variable displacement pump to zero.

The adjustment of the variable displacement pump to a lower discharge volume advantageously takes place so that there is a dependence upon the overspeed exceeding the limiting rpm, in which case the variable displacement pump is adjusted with a high speed or by a change to a smaller discharge volume, the greater the overspeed, i.e., the greater the extent by which the limiting rpm was exceeded. In the case where a satisfactory speed reduction is obtained in spite of the adjustment of the discharge volume of the variable displacement pump, it is provided according to an additional step of the method of the invention wherein the variable displacement motor of the hydrostatic drive unit is set to a greater absorption volume during the braking process, by which the transmission ratio of the hydrostatic drive unit is more sharply modified toward a decrease in travel speed. Due to the adjustment of the absorption volume of the pump, the braking action and the motor regulate the speed. For example, by setting the discharge volume of the variable displacement pump to zero, the driving engine can be uncoupled from the hydrostatic drive unit, while at the same time, the travel speed is reduced by adjusting the discharge volume controlled by the variable displacement motor toward the maximum. The pressure rise caused by the changes in the discharge volume is reduced by pressure limiting valves. Thus, the vehicle can be positively braked hydraulically without overspeeding the driving engine.

When very sharp braking occurs, the static friction between the vehicle wheels and the roadway can be reduced. According to another embodiment of the invention, when there is a reduction of the static friction between the vehicle wheels and the roadway, the variable displacement pump and/or the variable displacement motor are adjusted toward a recovery of the static friction in the sense of an anti-locking system where the adjustment takes place quite rapidly. Through such a control of the hydraulic mechanisms, the steering that is lost due to the reduction of static friction is recovered which prevents a dangerous driving situation such as a skid.

In another embodiment of the invention, the positive hydraulic braking can occur because a variable displacement pump of an additional hydraulic drive, e.g., for implements or tools, which is driven by the driving engine, is adjusted to a greater discharge volume when a limiting rpm of the driving engine is exceeded and the discharge pressure generated is reduced by at least one pressure limiting valve. The discharge volume of this pump is normally set to zero during travel operation, but can be increased for braking, in which case no hydraulic consumer is actuated, i.e., the supply line is blocked off, and an increase in feed pressure occurs, which, as is known, is reduced through pressure limiting valves and the kinetic energy of the vehicle is converted into heat.

Another advantageous refinement of the method of the invention is achieved if the variable displacement pump is adjusted to a greater discharge volume as a function of the overspeed exceeding the limiting rpm. In this case, the variable displacement pump is set to a greater discharge volume and the feed pressure increases as the overspeed increases. At the same time, speed regulation is also attainable by a transmission change in the hydrostatic travel drive to a lower speed during braking. After the positive hydraulic braking, the transmission of the hydrostatic drive unit is automatically set to a lower travel speed.

The method described is suitable, for example, for construction machines such as track-laying vehicles and front wheel loaders and for fork lifts.

While preferred embodiments of the invention are described herein, it is to be understood that the invention may be otherwise embodied within the scope of the appended claims.

We claim:

1. A method for automatically controlling braking of a wheeled vehicle having at least on adjustable hydrostatic drive unit with a variable displacement pump, a motor and a driving engine, said method comprising:
   a) absorbing a drag moment by said engine; and
   b) hydraulically reducing the kinetic energy of said vehicle by positive hydraulic braking when a maximum drag moment absorbable by said driving engine is exceeded, wherein said positive hydraulic braking comprises determining when a limiting rpm of said driving engine is exceeded, and hydraulic braking said vehicle to a speed at which an incline output power is less than or equal to the drag power absorbable by said driving engine.

2. A method according to claim 1, including adjusting said variable displacement pump of said adjustable hydrostatic drive unit to a smaller discharge volume and reducing the pressure into the feed lines of said hydrostatic drive unit by at least one pressurelimiting valve.

3. A method according to claim 2, including adjusting said variable displacement pump to a lower discharge volume as a function of the overspeed exceeding the limiting rpm and adjusting said variable displacement pump from a high speed to a lower discharge volume in accordance with the amount of the overspeed.

4. A method according to claim 3, including adjusting said variable displacement pump said motor to function as an anti-locking system to recover the static friction when the static friction between the wheels of said vehicle and the roadway breaks down.

5. A method according to claim 3, where at least one motor of said hydrostatic drive unit is a variable displacement motor, adjusting said variable displacement motor to a higher absorption volume during braking.

6. A method according to claim 5, including adjusting said variable displacement pump said variable displacement motor to function as an anti-locking system to recover the static friction when the static friction between the wheels of said vehicle and the roadway breaks down.

7. A method according to claim 2, where at least one motor of said hydrostatic drive unit is a variable displacement motor, adjusting said variable displacement motor to a higher absorption volume during braking.

8. A method according to claim 7, including adjusting said variable displacement pump said variable displacement motor to function as an anti-locking system to recover the static friction when the static friction between the wheels of said vehicle and the roadway breaks down.

9. A method according to claim 2, including adjusting said variable displacement pump said motor to function as an anti-locking system to recover the static friction when the static friction between the wheels of said vehicle and the roadway breaks down.

10. A method according to claim 1, wherein at least one motor of said hydrostatic drive unit is a variable displacement motor, adjusting said variable displacement motor to a higher absorption volume during braking.

11. A method according to claim 10, including adjusting said variable displacement pump said variable displacement motor to function as an anti-locking system to recover the static friction when the static friction between the wheels of said vehicle and the roadway breaks down.

12. A method according to claim 1, including adjusting said variable displacement pump and/or said motor to function as an anti-locking system to recover the static friction between the wheels of said vehicle and the roadway during a skid.

13. A method according to claim 1, wherein said vehicle includes an additional hydraulic drive having a variable displacement pump for implements or tools including adjusting said variable displacement pump to increase the discharge volume when a limiting rpm of said driving engine is exceeded, and reducing the delivery pressure generated through at least one pressure-limiting valve.

14. A method according to claim 13, wherein a variation in the transmission of said hydrostatic drive unit in the direction of a slower travel speed takes place during braking.

15. A method according to claim 13, including adjusting said variable displacement pump of said additional hydraulic drive to function as an anti-locking system to recover static friction when the static friction between the vehicle wheels and the roadway decreases.

16. A method according to claim 13, including adjusting said variable displacement pump to a greater delivery volume as a function of the excess overspeed above the limiting rpm, wherein said variable displacement pump is adjusted to a greater delivery volume and the feed pressure becomes greater in accordance with the overspeed.

17. A method according to claim 16, wherein a variation in the transmission of said hydrostatic drive unit in the direction toward a slower travel speed takes place during braking.

18. A method according to claim 16, including adjusting said variable displacement pump of said additional hydraulic drive to function as an anti-locking system to recover static friction when the static friction between the vehicle wheels and the roadway decreases.

19. A method according to claim 1, wherein said vehicle is braked with independent speed regulation that excludes the intervention of the vehicle operator.

* * * * *

UNITED STATES PATENT AND TRADEMARK OFFICE
CERTIFICATE OF CORRECTION

PATENT NO. : 5,145,238
DATED : September 8, 1992
INVENTOR(S) : Hilmar Strenzke and Erwin Hartung It is certified that error appears in the above-identified patent and that said Letters Patent is hereby corrected as shown below:

Column 2 Lines 43-62 delete "SUMMARY OF THE INVENTION" through "DESCRIPTION OF THE PREFERRED EMBODIMENTS".

Claim 2 Line 64 Column 4 "pressurelimiting" should read --pressure-limiting--.

Claim 4 Line 4 Column 5 after "pump" insert --or--.

Claim 6 Line 14 Column 5 after "pump" insert --or--.

Claim 8 Line 25 Column 5 after "pump" insert --or--.

Claim 9 Line 31 Column 5 after "pump" insert --or--.

Claim 11 Line 42 Column 5 after "pump" insert --or--.

Signed and Sealed this

Fourteenth Day of September, 1993

Attest:

BRUCE LEHMAN

Attesting Officer     Commissioner of Patents and Trademarks